United States Patent Office

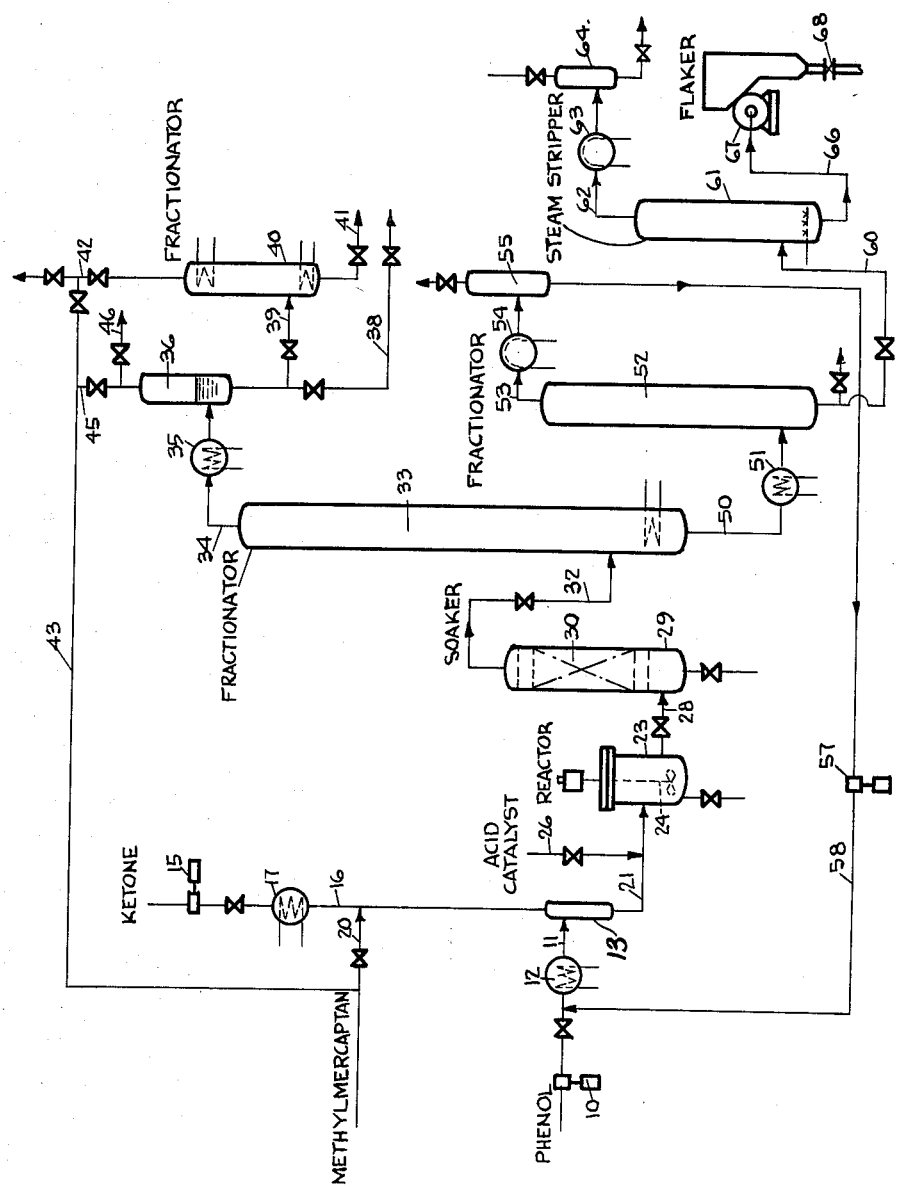

2,730,553
Patented Jan. 10, 1956

2,730,553

PRODUCTION OF BIS DI-(HYDROXYARYL) SUBSTITUTED COMPOUNDS

George T. Williamson, Oakland, Calif., assignor to Shell Development Company, Emeryville, Calif., a corporation of Delaware Application August 25, 1952, Serial No. 306,173

5 Claims. (Cl. 260—619)

This invention relates to the production of bis di-(hydroxyaryl compounds and relates more particularly to the production of hydroxyphenyl-substituted alkanes wherein the nuclei of two phenolic radicals are directly attached to a single carbon atom in the alkyl group. A particular aspect of the invention relates to the production of gem di-(hydroxyphenyl) propane.

The present application is a continuation in part of co-pending applications Serial No. 306,171 and Serial No. 306,172, filed August 25, 1952.

Hydroxyphenyl-substituted compounds such as, for example, the hydroxyphenyl-substituted alkanes are employed as starting and intermediate materials in the production of a wide variety of organic products. Methods for their production involve the condensation of a phenolic compound with a carbonyl compound, for example, a ketone, in the presence of an acid condensation catalyst. Many of the processes disclosed heretofore generally use conditions wherein the contact time must of necessity be of such duration as to render highly impractical any large scale operation thereof. Contact times in the order of from about ten to about sixteen hours and even higher, were often required. Serious disadvantages resulting from long periods of contact time unavoidably encountered in such processes include production of by-products to an inordinate degree as well as substantial product disintegration. As a result, the desired bis(hydroxyaryl) compound is contained in a relatively complex reaction mixture from which it is separated in a sufficiently high degree of purity only with great difficulty and at relatively high costs. The application to such methods of continuous operation essential to efficient production of the desired material on a relatively large scale, is, therefore, generally highly impractical.

In order to overcome difficulties inherent in such processes it has been suggested to add certain materials as promoters for the reaction. Materials suggested comprise certain normally liquid or solid sulfur-containing compounds as well as hydrogen sulfide. Some of these materials do enable a degree of reduction in the contact time. However, the reduction in contact time is generally insufficient to enable continuous operation and is often accompanied by difficulties which offset any advantages. A serious disadvantage inherent in the use of many of the normally liquid and solid materials suggested as promoters heretofore resides in the fact that they are often removed only with difficulty, if at all, from the resulting reaction mixture containing them, thereby additionally complicating the already complex problem of product separation. The ability to use the bis(hydroxyaryl) compounds in many fields of application, and particularly in the field of resin manufacture, is often dependent upon their purity. Since compounds disclosed heretofore as capable of promoting the condensation reaction are generally highly undesirable contaminants in the resulting product, their use, particularly in view of the difficulty with which they are separated from the reaction mixture, contributes to aggravation of product contamination. Normally gaseous materials such as hydrogen sulfide comprised in compounds disclosed heretofore as capable of functioning as promoters for the condensation reaction are often ineffective in reducing the contact times when employed in quantities and at conditions commensurate with practical scale operation. Resort to their use therefore does not enable continuous operation under the process conditions disclosed heretofore.

It is an object of the present invention to provide an improved process enabling the more efficient production of bis(hydroxyaryl) substituted compounds wherein the above difficulties are obviated to at least a substantial degree. A further object of the invention is to provide an improved process enabling the efficient production of the desired bis(hydroxyaryl) substituted compounds by the condensation of a phenol with a carbonyl compound in a continuous process wherein the desired bis(hydroxyaryl) substituted compounds are obtained in a relatively high degree of purity with a minimum of operative steps. A still further object of the invention is the provision of an improved process enabling the efficient production in continuous operation of bis(hydroxyphenyl) alkanes. A particular object of the invention is an improved process enabling the efficient production in a continuous operational procedure of gem di-(hydroxyphenyl) propane by the acid-catalyzed condensation of phenol with acetone. Other objects and advantages of the invention will become apparent from the following detailed description thereof.

In the production of the bis(hydroxyaryl) compounds by the condensation of a carbonyl compound with a phenol these reactants have generally been employed heretofore in substantial equi-molar ratios or under conditions in which the phenol is present in relatively slight excess. Difficulties inherent in processes disclosed heretofore involve complexity of the reaction mixture obtained and consequent difficulties in the separation of the desired bis(hydroxyaryl) compound therefrom in a high state of purity. Increasing the amount of phenol within the range described heretofore often was found to upset reaction conditions and temperature balance to an extent aggravating the problems of product purity and product recovery. Within those ranges of permissible ratios of reactants disclosed heretofore, continuous operation could not be achieved at temperatures enabling the attainment of high yields, product purity and simplicity of product recovery.

In co-pending application Serial No. 306,171, filed August 25, 1952, it was disclosed that substantial improvements in the production of the bis(hydroxyaryl) compounds are realized bringing continuous operation within the realm of practicability by effecting the acid-catalyzed condensation of the carbonyl compound with the phenol in the presence of a mol ratio of the phenol to the carbonyl compound of at least 10:1 and preferably at least 12:1.

It has now been found that in the production of the bis(hydroxyaryl) compounds by the acid-catalyzed condensation of carbonyl compounds with phenols substantial increase in yields is realized enabling the obtaining of substantially theoretical yields efficiently in continuous operation by passing substantially all effluence from the reaction zone into a soaking zone. It has been found that the substantial increase in yield is obtained with a combined total residence time in reactor and soaker which is substantially shorter than the residence time in the reactor required to obtain an approximate yield in the absence of the soaking zone following the reactor.

In accordance with the present invention a bis(hydroxyphenyl) alkane such as, for example, a gem di-(hydroxyphenyl) propane is produced in continuous operation by the passage of a stream containing an admixture of phenol, acetone and an acid catalyst, wherein the phenol is present in substantial molecular excess over the carbonyl compound consecutively through a reaction zone and a soaking zone each of said zones being maintained at a temperature of from about 20° C. to about 110° C. The condensation is preferably carried out in the presence of a suitable promoter for the acid-catalyzed reaction.

In the process of the present invention the condensation reaction is preferably executed in the presence of a substantially greater excess of the phenol than generally employed before. The presence of the phenol in a mol ratio of phenol to carbonyl compound of at least 10:1, and preferably in the range of at least 12:1 it has been found is essential to the attainment of optimum yields of the desired bis(hydroxyaryl) compounds in the continuous process of the present invention. Comparative experiments in which bis-(hydroxyphenyl) propane was produced by the condensation of phenol with dimethyl ketone at 60° C. with a contact time of five hours in the presence of added hydrogen chloride and ethyl mercaptan, each operation being conducted under substantially identical conditions with the exception that the mol ratio of phenol to dimethyl ketone in the charge differed, have shown that at a molar ratio of phenol to dimethyl ketone below 10:1 solid separation in the system was such as to preclude efficient continuous operation. Temperature increase to obtain suitable fluidity of the resulting solid-containing mixtures generally can be resorted to only at the expense of product loss. In the runs wherein a mol ratio of phenol to dimethyl ketone of 10:1 and higher was employed no substantial degree of solid separation was encountered. Molar ratios of phenol to dimethyl ketone ranging up to 25 to 1 were employed under the above specified conditions without encountering any substantial degree of solid separation within the system and product separation difficulties and product loss which such solid separation generally entails.

Phenolic compounds reacted with carbonyl compounds to obtain the bis(hydroxyaryl) compounds in accordance with the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis-(hydroxyaryl) compounds in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethylphenol, 4-ethylphenol, 2-ethyl-4-methylphenol, 2,3,6-tri-methylphenol, 2-methyl-4-tertiary-butylphenol, 2,4-di-tertiary-butylphenol, 4-methyl-2-tertiary-butylphenol, 2-tertiary - butyl - 4 - methylphenol, 2,3,5,6 - tetramethylphenols, 2,6-dimethylphenol, 2,6-ditertiary-butylphenol, 3,5-dimethylphenol, 3,5-diethylphenol, 2-methyl-3,5-diethylphenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids and the like may serve as the phenolic starting material of the process within the scope of the invention.

Phenolic compounds leading to products of particular value in many fields of application comprise those having a total number of carbon atoms in the range of, for example, from 6 to about 20, and wherein individual substituent hydrocarbon groups contain from one to about 12 carbon atoms.

The class of carbonyl compounds reacted with a phenolic compound in the process of the invention is represented by the empirical formula:

$$R^1-\overset{O}{\underset{\|}{C}}=R^2 \qquad (I)$$

wherein $R^1$ represents a member of the group consisting of any monovalent organic radical, aliphatic, cycloaliphatic, aromatic, heterocyclic, including hydrocarbon radicals such as alkyl, cycloalkyl, aryl, aralkyl, alkaryl, including saturated and unsaturated groups and $R^2$ represents a member of the group consisting of hydrogen and any monovalent organic radical, aliphatic, cycloaliphatic, aromatic, heterocyclic, including hydrocarbon radicals such as alkyl, cycloalkyl, aryl, aralkyl and alkaryl. The suitable carbonyl compounds comprise the ketones and aldehydes. Examples of such suitable ketones and aldehydes comprise dimethyl ketone, methyl ethyl ketone, diethyl ketone, dibutyl ketone, methyl isobutyl ketone, cyclohexanone, propionylphenone, methyl- and amyl-ketone, mesityl oxide, cyclopentanone, acetophenone and acetaldehyde, propionaldehyde, butyraldehyde and benzaldehyde.

The specific carbonyl compound employed as starting material will depend upon the specific bis(hydroxyaryl) compound desired and may be governed to some extent by specific operation conditions employed. Particularly suitable compounds comprised in the above-defined class of carbonylic compounds comprise the aliphatic ketones and aldehydes having from three to fourteen carbon atoms to the molecule.

The reaction of the phenolic compound with a carbonyl compound in accordance with the invention is executed in the presence of an acid-acting catalyst such as, for example, a hydrogen halide such as hydrogen chloride, preferably in the anhydrous state. The use of the hydrogen chloride in amounts ranging from about 0.5% to about 20% by weight and preferably from about 3% to about 6% by weight based upon the yield of bis(hydroxyaryl) compound has been found satisfactory. Greater proportions of hydrogen chloride may, however, be employed within the scope of the invention. Maintenance of a desired concentration of hydrogen chloride in the reaction mixture may be controlled by the use of superatmospheric pressure and/or the use of an appropriate solvent.

Although hydrogen chloride is chosen as a preferred catalytic agent the process of the invention is in no wise limited to the use of only this active agent. Acidic agents comprising any strong mineral acid and acid-acting condensing agents such as, for example, sulfuric acid, hydrochloric acid, phosphoric acid, hydrobromic acid, hydrofluoric acid, nitric acid, acetyl chloride, dimethylsulfate, sulfur dioxide, p-toluene sulfonic acid, boron trifluoride, boron trifluoride complexes and other acid-acting compounds comprising compounds which are hydrolyzed by water to form acids such as aluminum chloride, sulfonyl chloride, phosgene, etc. Of the strong acids those having a dissociation constant greater than $10^{-3}$, and particularly the strong mineral acids are preferred.

Reaction of the phenolic compound with the carbonyl compound in accordance with the invention is executed under conditions at which at least a substantial part of the reactants and reaction products are maintained in the liquid phase. The reactants are introduced into the reaction zone of the process under controlled conditions assuring a ratio of phenolic component to carbonylic component of at least 10:1, for example, from about 10:1 to about 25:1 and preferably in the range of from about 12:1 to about 20:1.

The reaction is preferably executed in the presence of an added promoter for the acid-catalyzed reaction. Any of the promoters disclosed heretofore for the acid-catalyzed condensation of a phenol with a carbonyl compound may be employed within the scope of the invention. It is, however, preferred to employ as a promoter a normally gaseous material consisting essentially of methyl mercaptan. As disclosed in copending application Serial No. 306,172, filed August 25, 1952, of which the present application is a continuation-in-part, methyl mercaptan is unique in its ability to promote the acid-catalyzed condensation of phenolic compounds with carbonyl compounds. It is distinguished in this regard from materials suggested heretofore as promoters for the reaction not only because of its ability to reduce to a surprising degree the time of contact, but because it enables such substantial reduction in contact time to be attained with the use of only a minimum amount of added promoter in the absence of any substantial amount of by-product formation or product disintegration. Such absence to any substantial degree of by-product formation and product disintegration aids in enabling the process to be carried out in a continuous method with the production of a reaction mixture from which the desired bis(hydroxyaryl) compound as well as charge components suitable for recycling are separated in a relatively high degree of purity with a minimum of operative steps.

The relatively small amounts of methyl mercaptan which need be employed to obtain substantial reduction of contact time and the ease with which this highly volatile compound is removed unaltered from the resulting reaction mixture contribute materially not only to avoidance of product contamination but to a reduction in cost of catalyst as well as overall operation.

The methyl mercaptan may be introduced into the system by solution in a portion, or all, of the carbonyl reactant to the process and/or by its direct introduction into the reaction zone. It may be introduced continuously or incrementally during the course of the operation. A particular advantage of the use of the methyl mercaptan resides in the ability to obtain surprisingly increased reaction rates with relatively small amounts of the methyl mercaptan. Amounts of methyl mercaptan ranging, for example, from as little as 0.01% to about 0.5% enable the attainment of increases in reaction rates bringing continuous operation in the production of the desired bis(hydroxyaryl) compounds by the acid-catalyzed condensation of phenols with carbonyl compounds within the realm of practicability. The optimum amount of methyl mercaptan to be employed will be governed to some extent by the particular reactants as well as specific operating conditions employed. Amounts of the methyl mercaptan ranging up to about 1% by weight based on the theoretical yield in the case of gem di-(hydroxyphenyl) propane production generally suffice to obtain an increase in reaction rate commensurate with continuous operation. Higher amounts may, however, be employed within the scope of the invention. Methyl mercaptan introduced into the reaction zone need not necessarily be in essentially pure state. Thus, methyl mercaptan may be introduced into the system in admixture with a normally gaseous carrying medium or diluent for example, an inert normally gaseous material such as a normally gaseous paraffinic hydrocarbon, nitrogen and the like. A particularly suitable methyl mercaptan promoter is the methyl mercaptan-containing fractions separated from mercaptan-containing hydrocarbon mixtures of natural petroleum origin. Although methyl mercaptan has been set forth above as the preferred promoter in the execution of the acid-catalyzed reaction in the process of the invention, it is to be pointed out that the invention is not limited to the use of this specific promoter. The use of other promoters in the process, for example, ionizable sulfur compounds, alkyl mercaptans such as ethyl mercaptan, thiophenols, mercapto-substituted aliphatic monocarboxylic acids and the like is comprised within the scope of the invention.

The reaction zone employed in the process of the invention may comprise a zone of enlarged cross-sectional area such as, for example, a chamber, a tank, an autoclave, or the like, and/or a zone of restricted cross-sectional area such as, for example, a coil, a tubular reactor or the like. When the reaction zone comprises more than one vessel such vessels may be arranged in series or parallel flow. Means such as, for example, conventional means for the withdrawal of heat from, or the addition of heat to, the contents of the reaction zone are preferably provided. Means for maintaining the contents of the reaction zone in a state of agitation, such as, for example, stirrers, the injection of normally gaseous media, and the like, may be employed. In accordance with the process of the invention all reactants comprising the phenol and carbonyl charge components, as well as the acid catalyst and the promoter, are introduced into the reaction zone.

Conditions are maintained in the reaction zone to initiate the condensation of the phenol with the carbonyl compound with the formation of products comprising the desired bis(hydroxyaryl) compounds. Temperatures maintained in the reaction zone are those assuring the presence of at least a substantial amount of the reaction mixture in the liquid phase. The specific temperature employed will vary to some degree with the nature of the specific reactants and other operating conditions employed. The use of temperatures sufficiently high to cause degradation of any substantial part of the reaction mixture, or the formation to any substantial degree of undesired by-products, is preferably avoided. Temperatures may range, for example, from about 20 to about 110° C. and preferably from about 45 to about 80° C. The process may be carried out at atmospheric, subatmospheric or superatmospheric pressures. In general the use of atmospheric pressure or a slightly elevated pressure assuring continuity of flow through the system of continuous operation, for example, up to about 50 pounds per square inch is preferred. Resort to the use of pressure above atmospheric is at times desirable to aid in the maintenance within the reaction zone of desired concentrations of a specific normally gaseous material such as, for example, hydrogen chloride.

At least the greater part of the reactor effluence is passed therefrom directly into a soaking zone. The soaking zone may comprise a zone of enlarged cross-sectional area such as, for example, a tower, column, chamber, tank, or the like and/or a zone of restricted cross-sectional area such as, for example a coil, tube, bundle, or the like. When the soaking zone comprises more than one vessel such vessels may be arranged in series or in parallel flow. The soaking zone is, however, always arranged in series flow with the reaction zone. The soaking zone is provided with conventional means such as, for example, insulation, means for adding heat to or withdrawing heat from the soaking zone contents, and the like, to enable the maintenance therein of the desired temperature. Means are preferably provided to maintain the contents of the soaking zone in a state of agitation for the purpose of temperature control. Agitation within the soaking zone is obtained by the use of suitable column packing material, baffles, bubble plates, grid trays, or the like, when a zone of enlarged cross-sectional area is employed. Means which may be employed to agitate the soaking zone contents comprise the maintenance of a circulating stream of the soaking mixture through a conduit comprised in the soaking zone, the maintenance of turbulent flow conditions, the use of stirrers, the injection of inert normally gaseous media and the like.

Conditions to be maintained in the soaking zone are those resulting in the completion of the reaction initiated in the reaction zone in the absence of any substantial formation of undesired by-products. Suitable temperatures and pressures to be maintained within the soaking zone are those comprised in the range specified above as suitable for maintenance in the reaction zone. Although the specific temperature and pressure conditions within the specified range preferably maintained in the soaking zone need not necessarily be those maintained within the reaction zone, it has been found that in general the maintenance of conditions of temperature and pressure in the soaking zone which are essentially the same as those in the reaction zone are satisfactory to obtain the objects of the invention. Conditions of temperature and pressure within the soaking zone are, however, always controlled to maintain at least a substantial portion of the contents of the soaking zone in the liquid phase.

The use of solvents which are relatively inert under the conditions of execution of the reaction such as, for example, water immiscible organic compounds, for example, aromatic hydrocarbons such as xylene, toluene, chlorinated hydrocarbons; or in the absence of such water-immiscible compounds the use of moderate amounts of water may be employed within the scope of the invention. It is to be pointed out, however, that a specific advantage of the process of the invention, when employing continuous operation with a mol ratio of phenolic reactant to carbonyl reactant of at least 10:1 in the presence of the acid catalyst, resides in the efficient operation without the need of added solvents or diluents. When employing such solvents or diluents a part or all of such solvents may be introduced in either the reaction or soaking zone or into both of these zones.

The time of residence of the reactants in the reaction zone and in the soaking zone may vary considerably within the scope of the invention depending upon the specific conditions within the above prescribed range maintained in each of the zones and the specific materials charged to the process. Residence time within the soaking zone is generally of a duration enabling substantial completion of the reaction at the conditions prevailing therein. Residence time in the range comprising as a minimum the time enabling initiation of the reaction and as a maximum the time enabling substantial interaction of the reactants charged thereto. It has been found that maintenance of substantially equal residence time in reaction zone and soaker enables attainment of unusually high yields with a minimum of total residence time. It is to be pointed out that the invention is in no wise limited to the use of a specific ratio of residence time in reaction zone to residence time in soaking zone. It has been found, however, that the use of a combined reaction and soaking zone enables substantial increase in yield over those obtainable without the use of a soaking zone. A particular advantage of the invention distinguishing the process from those available heretofore resides in the relatively short contact times required to obtain high yield based on the reactants charged. Thus, contact times within a range of from about 15 minutes to about two hours have been found ample to obtain yields ranging up to at least 90% of the theoretical in the production of high purity 2,2-bis(4-hydroxyphenyl) propane using a mol ratio of phenol to dimethyl ketone of at least 10:1 in the presence of methyl mercaptan as the promoter for the acid-catalyzed reaction. Longer or shorter contact times may, however, be employed within the scope of the invention.

The desired bis(hydroxyaryl) compound and unconverted reactants such as phenol are separated from the reaction mixture. Unconverted reactants such as, for example, phenolic compounds are recycled to the reaction zone. Normally gaseous materials comprising, for example, normally gaseous promoter such as methyl mercaptan, if employed, as well as normally gaseous acid catalyst, are separated from reactor effluent and may be recycled in part or in entirety to the reaction zone. Suitable means comprising one or more such steps as, for example, stratification, distillation, solvent extraction, extractive distillation, adsorption, and the like may be resorted to in carrying out product separation.

Under the above-defined conditions the phenolic component and the carbonylic component of the charge to the process interact with the formation of a reaction mixture comprising bis(hydroxyphenyl) compounds. The bis(hydroxyphenyl) compounds obtained consist essentially of compounds wherein the nuclei of two phenolic radicals are directly attached by carbon-to-carbon linkage to the same single carbon atom in the alkyl group as represented by the following formula:

$$HO-Ar-\underset{\underset{R^2}{|}}{\overset{\overset{R^1}{|}}{C}}-Ar'-OH \qquad (II)$$

wherein $R^1$ is a member of the group consisting of monovalent organic radicals including hydrocarbon radicals such as alkyl, cycloalkyl, aryl, alkaryl and aralkyl which may be saturated or unsaturated, and Ar—OH and Ar'—OH are phenolic radicals, and $R^2$ is a member of the group consisting of hydrogen and monovalent organic radicals including hydrocarbon radicals such as alkyl, cycloalkyl, aryl, alkaryl and aralkyl which may be saturated or unsaturated, and Ar—OH and Ar'—OH are phenolic radicals. In the bis(hydroxyaryl) alkanes represented by Formula II the radicals $R^1$ and $R^2$ have the same significance as in the above-defined Formula I representing the suitable carbonylic starting materials. The phenolic radicals Ar—OH and Ar'—OH in the above Formula II will correspond to the phenolic radical obtained by the removal of hydrogen from a nuclear carbon atom of a phenolic component of the charge to the process. Hydroxyphenyl-substituted compounds, having a specifically desired composition and structure, are therefore obtained in accordance with the invention by the judicious selection of specific carbonylic and phenolic starting reactants. Thus, the interaction of unsubstituted phenol with an aliphatic ketone such as, for example, dimethylketone, will result in reaction products comprising gem (4-hydroxyphenyl) propane. The reaction products obtained will generally comprise isomeric forms of the bis(hydroxyaryl) compounds. Thus, the interaction of unsubstituted phenol with dimethyl ketone in accordance with the invention, the reaction products will comprise a mixture of bis(4-hydroxyphenyl) alkane and bis-(2-hydroxyphenyl) alkane, in which the former will generally greatly predominate.

In order to set forth more fully the nature of the invention as applied to the continuous production of the bis-(hydroxyaryl) compounds it will be described in greater detail hereinbelow as applied to the production of a bis-(hydroxyphenyl) compound such as, for example, gem di-(4-hydroxyphenyl) propane by the condensation of phenol with dimethyl ketone with reference to the attached drawing wherein the single figure illustrates one form of apparatus suitable for carrying out the production of the invention.

Referring to the drawing a phenol, for example, phenol emanating from an outside source is formed by means of pump 10 through valved line 11 provided with preheater 12 into a suitable mixing zone. The mixing zone may comprise any suitable means such as, for example, chamber 13 enabling admixture of charge components to the system. A carbonyl compound such as, for example, dimethyl ketone emanating from an outside source, is forced by means of pump 15 through valved line 16, provided with indirect heat exchanger 17, into chamber 13. A promoter, for example, a normally gaseous stream comprising methyl mercaptan is passed through valved line 20 into line 16. Within chamber 13 the phenol, dimethyl ketone and methyl mercaptan are admixed by passage of the charge components therethrough. From chamber 13 the mixed charge is passed through line 21 into a suitable reaction zone.

The reaction zone may comprise a suitable reactor, for example, reactor 23, provided with suitable means for maintaining the contents thereof in a state of agitation such as, for example, a stirrer 24.

An acid catalyst such as, for example, hydrogen chloride is passed through valved line 26 into line 21 entering reactor 23. Addition of the acid catalyst to the charge preferably is made immediately prior to entrance of the mixed charge into reactor 23. Since in the presence of the methyl mercaptan promoter the reaction will be initiated substantially immediately upon contact with the acid catalyst the presence of the acid catalyst in any substantial portion of the equipment preceding the reactor is preferably avoided. A part or all of the acid catalyst may be introduced as a separate stream directly into reactor 23. The introduction of phenol and dimethyl ketone into the system is preferably controlled to maintain the ratio of phenol to dimethyl ketone in the mixture entering reactor 23 at about 10:1 or higher, for example, in the range of from about 10:1 to about 20:1 and more preferably from about 12:1 to about 15:1.

The methyl mercaptan promoter is introduced in controlled amounts to maintain its concentration in the reactor in the range of from about 0.25% to about 1.0% based on theoretical yield of 2,2-bis(p-hydroxyphenyl) propane.

Hydrogen chloride introduction is controlled to maintain its concentration in the reactor 23 in the range of about 1% to about 12% and preferably from about 3% to about 6% by weight based on theoretical product yield. The temperature within the reactor is maintained in the range of from about 55° C. to about 80° C. and preferably from about 60° C. to about 65° C. Under the above-defined conditions phenol and dimethyl ketone react within reactor 23 with the formation of reaction products comprising bis di-(hydroxyphenyl) propane consisting essentially of 2,2-bis(4-hydroxyphenyl) propane.

Effluence from reactor 23 is passed through valved line 28 into a suitable soaking zone. In the drawing the soaking zone is depicted by tower 29 containing a bed of inert packing material 30. Any suitable inert packing material such as, for example, crushed rock, Raschig rings, glass wool, or the like may be employed. Instead of packing material tower 29 may be equipped with suitable perforated trays, baffles, grids or the like. Within tower 29 the reaction mixture is maintained at substantially the same temperature as that maintained within the reactor 23. Reactor effluence is maintained in tower 29 for a time sufficient to complete the desired degree of conversion. It has been found that the use of the reactor in combination with a soaker aids in the attainment of unusually high conversions with short periods of contact time assuring efficient operation of the continuous operation. In a preferred method of carrying out the invention the reaction is initiated within the reaction zone and permitted to go to completion within the soaker. The residence time in each of the zones may vary considerably within the scope of the invention and depends to some extent upon specific operating conditions employed. In general, it has been found that the overall time of residence within the combined reactor 23 and soaker 29 in the range of from about 0.5 to about 3 hours and preferably from about 1 to about 2 hours is satisfactory. Under these conditions of maintenance of the reactants within reactor 23 for a time of from about 0.25 to about 1.5 hours and preferably from about 0.5 to about 1.0 hour and the remainder of the above-indicated overall time in tower 29 is highly satisfactory.

Longer or shorter residence time within reactor or soaker may be used, however, within the scope of the invention. Conditions within reactor 23 and tower 29 are controlled to maintain at least a substantial portion of the contents thereof in the liquid state. Effluence from tower 29 comprising bis di-(hydroxyphenyl) propane, unconverted phenol, hydrogen chloride and methyl mercaptan are passed through valved line 32 into a separating zone comprising fractionator 33. Within fractionator 33 there is separated a vapor fraction comprising normally gaseous materials including methyl mercaptan, hydrogen chloride, water and some entrained phenol from a liquid fraction comprising bis(hydroxyphenyl) propane and phenol. The vapor fraction is taken overhead from fractionator 33 through line 34 provided with condenser 35, and introduced into an accumulator 36. In passing through condenser 35 at least a substantial part of the stream flowing through line 34 is condensed. Condensate comprising hydrogen chloride, water and entrained phenol is taken from accumulator 36 by means of valved line 38. A part or all of the condensate flowing through line 38 may be passed through a valved line 39 into a separating zone comprising a fractionator 40. Within fractionator 40 a normally gaseous fraction comprising methyl mercaptan and hydrogen chloride is separated from a liquid fraction comprising phenol, water and hydrogen chloride. The liquid fraction is withdrawn from fractionator 40 by means of valved line 41. Normally gaseous overhead from fractionator 40 is eliminated therefrom by means of valved line 42. A part or all of the normally gaseous stream comprising methyl mercaptan and hydrogen chloride flowing through valved line 42 may be passed through valved line 43 into line 20. Normally gaseous material comprising methyl mercaptan and hydrogen chloride may be passed directly from accumulator 36 through valved line 45 into line 43. A valved line 46 is provided for eliminating normally gaseous materials from the system.

The liquid fraction comprising phenol and bis(hydroxyphenyl) propane separated in fractionator 33 is passed therefrom through line 50 provided with suitable heating means such as, for example, heat exchanger 51 into a fractionating zone comprising fractionator 52. Within fractionator 52 there is separated a vapor fraction comprising phenol from a liquid fraction comprising bis(hydroxyphenyl) propane. The vapor fraction is passed from fractionator 52 through line 53 provided with condenser 54, into an accumulator 55. Condensate consisting essentially of phenol is forced from accumulator 55 by means of pump 57 through line 58 into line 11.

The liquid fraction separated in fractionator 52 is passed therefrom through valved line 60 into a stripping column 61. Within stripping column 61 the liquid fraction consisting essentially of bis(hydroxyphenyl) propane and traces of unconverted phenol is subjected to a steam stripping operation to strip the last traces of phenol out of the bis(hydroxyphenyl) propane. Overhead from column 61 consisting essentially of water and phenol is passed through line 62 provided with condenser 63 into an accumulator 64.

Bottoms from column 61 consisting essentially of liquefied bis-2,2(4-hydroxyphenyl) propane is passed through line 66 to a flaker 67. High purity bis(hydroxyphenyl) propane consisting essentially of gem-2,2(4-hydroxyphenyl) propane is taken from flaker 67 by means of conduit 68 as a final product.

The efficiency with which bis(phenylhydroxy) alkanes are obtained in a continuous operation in accordance with the invention is evidenced by the following examples:

*Example I*

2,2-bis(4-hydroxyphenyl) propane was produced in a continuous operation by charging a continuous stream of admixed phenol, dimethyl ketone, hydrogen chloride and methyl mercaptan into a reactor maintained at a temperature of 65° C. and provided with a stirrer. The rate of feed to the reactor was controlled to maintain the residence time in the reactor at about 30 minutes. The mixture charged to the reactor contained phenol and dimethyl ketone in a molar ratio of phenol to dimethyl ketone of 10:1. The methyl mercaptan content of the charge was equivalent to 1 percent (based on the theoretical yield of 2,2-bis(4-hydroxyphenyl) propane). The hydrogen chloride was added in an amount equal to about 6% by weight (based on theoretical yield of 2,2-bis(4-hydroxyphenyl) propane). Continuous operation was maintained for a period of approximately 8 hours without interruption. Effluence from the reactor was subjected to a first distillation to separate water, hydrogen chloride and methyl mercaptan therefrom. Bottoms from the first distillation consisting essentially of 2,2-bis(4-hydroxyphenyl) propane and phenol were subjected to a second distillation to separate the phenol as an overhead therefrom. Bottoms from the second distillation consisting essentially of 2,2-bis(4-hydroxyphenyl) propane were recovered as a final product. The overall yield of the desired 2,2-bis(4-hydroxyphenyl) propane was equal to 87% of theoretical.

*Example II*

The continuous operation of Example 1 was repeated under substantially identical conditions with the exception that the total effluence from the reactor was passed into a soaking chamber maintained at 65° C. and the residence time in the reactor and soaker was controlled to maintain the residence time in each at all times below 15 minutes. The reactor and soaker were connected in series flow. Effluence from the soaker was passed to the first distillation as described in Example I. Product recovery was carried out substantially as described in Example I. The overall yield of the desired 2,2-bis(4-hydroxyphenyl) propane was equal to 96% of the theoretical.

*Example III*

2,2-bis(4-hydroxyphenyl) propane was produced in a continuous operation by continuously introducing a stream of admixed phenol, dimethyl ketone, hydrogen chloride and methyl mercaptan into a reaction chamber provided with a stirrer. The reaction chamber was maintained at a temperature of 65° C. Charge to the reactor and withdrawal of effluence therefrom was controlled to maintain a residence time of one hour within the reactor. The mixture charged to the reactor contained phenol and dimethyl ketone in a molar ratio of 10:1. The methyl mercaptan content and the hydrogen chloride content of the charge to the reaction zone were equal to 1 percent and 6 percent by weight respectively, based on the theoretical yield of 2,2-bis(4-hydroxyphenyl) propane. 2,2-bis(4-hydroxyphenyl) propane was separated from the reactor effluence by distillation. The yield of 2,2-bis(4-hydroxyphenyl) propane was equal to 90% of the theoretical yield.

*Example IV*

The continuous operation of Example III was repeated under substantially identical conditions with the exception that all of the reactor effluence was passed into a soaking chamber and effluence from the soaking chamber to the product recovery operation. The soaking chamber was arranged in series flow with the reactor and maintained at 65° C. The residence time in the reactor and in the soaking chamber was controlled to maintain the residence time in each at 30 minutes. The yield of 2,2-bis(4-hydroxyphenyl) propane was equal to 98% of the theoretical.

*Example V*

2,2-bis(4-hydroxyphenyl) propane was prepared in a continuous operation by charging a continuous stream of admixed phenol, dimethyl ketone, methyl mercaptan and hydrogen chloride to a reactor provided with a stirrer and discharging into a soaking chamber. The soaking chamber was connected in series flow with the reactor. Both the reactor and the soaker were maintained at a temperature of 65° C. The rate of flow through the system was controlled to obtain a residence time of 1 hour in the reactor and 1 hour in the soaking chamber. The mixture charged to the reactor contained phenol and dimethyl ketone in the ratio of phenol to dimethyl ketone of 10:1, 1% methyl mercaptan based on theoretical yield of 2,2-bis(4-hydroxyphenyl) propane, and 6% by weight of hydrogen chloride. In the continuous operation 2,2-bis(4-hydroxyphenyl) propane and phenol were separated continuously from the effluence from the soaking chamber by passing the effluence from the soaking chamber into a first distillation chamber wherein it was subjected to flash distillation to separate hydrogen chloride, methyl mercaptan and water therefrom. Bottoms from the flash distillation consisting essentially of 2,2-bis(4-hydroxyphenyl) propane and phenol were passed to a second distillation wherein phenol was separated as overhead from bottoms consisting essentially of 2,2-bis(4-hydroxyphenyl) propane and a small amount of residual phenol. Bottoms from the second distillation were subjected to a steam distillation to separate substantially all traces of phenol therefrom leaving high purity 2,2-bis(4-hydroxyphenyl) propane as the product. Phenol separated from the reactor effluence was recycled to the reactor. Continuous operation was maintained without interruption for a period of about 104 hours. The overall yield of 2,2-bis(4-hydroxyphenyl) propane was equal to 99% of the theoretical yield.

*Example VI*

2,2-bis(4-hydroxyphenyl) propane was prepared in continuous operation by continuously charging a mixture consisting essentially of phenol, dimethyl ketone, hydrogen chloride and methyl mercaptan into a reactor provided with a stirrer and maintained at about 50° C. The total effluence from the reactor was passed into a soaking chamber maintained at about 50° C. The soaking chamber was connected with the reactor in series flow. The mixture charged to the reactor contained phenol and dimethyl ketone in a molar ratio of phenol to dimethyl ketone of 15:1. Methyl mercaptan and hydrogen chloride were present in the charge to the reactor in the amounts of 1% and 6% respectively, based on the theoretical yield of 2,2-bis(4-hydroxyphenyl) propane. The overall residence time in reactor and soaking chamber was 2 hours. 2,2-bis(4-hydroxyphenyl) propane was separated from the effluence from the soaking chamber by distillation. An overall yield of the desired 2,2-bis(4-hydroxyphenyl) propane was equal to 93% based on the theoretical.

The invention claimed is:

1. The continuous process for the production of bis-(hydroxyphenyl)alkanes, which comprises continuously introducing reactants comprising an aliphatic ketone, a substantial molar excess over said ketone of a phenol having at least one replaceable hydrogen attached to a nuclear carbon of the phenol ring, and a strong mineral acid catalyst, into a reaction zone maintained at a temperature of from about 20° to about 110° C., maintaining said reactants in the liquid phase in said reaction zone for a period of time sufficiently long to effect the interaction of at least a part but not all of said ketone with said phenol in said reaction zone, thereby forming an incompletely reacted reaction mixture comprising bis-(hydroxyphenyl)alkane, and unreacted ketone and phenol in said reaction zone, continuously withdrawing said incompletely reacted reaction mixture from said reaction zone, continuously passing said withdrawn mixture as the sole reactant feed into a soaking zone maintained at a temperature of from about 20° to about 110° C., maintaining said mixture substantially in the liquid phase in said soaking zone in a state of continuous agitation until substantial completion of the reaction at the prevailing conditions is attained, and continuously withdrawing reaction mixture comprising bis-(hydroxyphenyl)alkane from said soaking zone.

2. The continuous process for the production of bis-(hydroxyphenyl)alkanes, which comprises continuously introducing reactants comprising a phenol having at least one replaceable hydrogen attached to a nuclear carbon of the phenol ring and an aliphatic ketone, in a mole ratio of phenol to ketone of at least about 10:1, and a strong mineral acid catalyst into a reaction zone maintained at a temperature of from about 20° to about 110° C., maintaining said reactants in said reaction zone for a period of time between about ¼ and about 1½ hours sufficiently long to effect the interaction of at least a part but not all of said ketone with said phenol in said reaction zone, thereby forming an incompletely reacted reaction mixture comprising bis-(hydroxyphenyl) alkane, and unreacted ketone and phenol in said reaction zone, continuously withdrawing said incompletely reacted reaction mixture from said reaction zone, continuously passing said withdrawn mixture as the sole feed into a soaking zone maintained at a temperature of from about 20° to about 110° C., maintaining said reaction mixture in a state of continuous agitation in said soaking zone out of contact with fresh reactants for a period of time of from about ¼ to about 1½ hours, thereby effecting substantial completion of the reaction of said ketone with said phenol in said soaking zone, and continuously withdrawing reaction mixture comprising bis-(hydroxyphenyl)alkane from said soaking zone.

3. The process in accordance with claim 2 wherein said aliphatic ketone is dimethyl ketone.

4. The continuous process for the production of 2,2-bis-(4-hydroxyphenyl)propane, which comprises continuously introducing reactants comprising dimethyl ketone, a stoichiometric excess of phenol, and hydrogen chloride into a reaction zone maintained at a temperature of from about 20° to about 110° C., maintaining said reactants in said reaction zone for a period of time of from about ¼ to about 1½ hours, thereby forming an incompletely reacted reaction mixture comprising 2,2-bis-(4-hydroxyphenyl)propane, phenol and dimethyl ketone in said reaction zone, continuously withdrawing said incompletely reacted reaction mixture from said reaction zone, continuously passing said withdrawn mixture as the sole feed into a soaking zone maintained at a temperature of from about 20° to about 110° C., maintaining said reaction mixture in a state of continuous agitation for a period of time of from about ¼ to about 1½ hours in said soaking zone, thereby effecting substantial completion of the reaction of said ketone with phenol in said soaking zone, and continuously withdrawing reaction mixture comprising 2,2-bis-(4-hydroxyphenyl)propane from said soaking zone.

5. The continuous process for the production of 2,2-bis-(4-hydroxyphenyl)propane which comprises continuously introducing reactants comprising phenol and dimethyl ketone, in a mole ratio of phenol to ketone of about at least 10:1, and a strong mineral acid catalyst into a reaction zone maintained at a temperature of from about 20° to about 110° C., maintaining said reactants in said reaction zone for a period of time of from about ¼ to about 1½ hours in said reaction zone, thereby forming an incompletely reacted reaction mixture comprising 2,2-bis-(4-hydroxyphenyl) alkane, phenol and dimethyl ketone in said reaction zone, continuously withdrawing said incompletely reacted mixture from said reaction zone, continuously passing said withdrawn mixture as the sole reactant feed into a soaking zone, maintained at a temperature of from about 45° to about 80° C., maintaining said reaction mixture in a state of continuous agitation for a period of time of from about ¼ to about 1½ hours in said soaking zone, thereby effecting substantial completion of the reaction of said ketone with phenol in said soaking zone out of contact with fresh reactants, and continuously withdrawing reaction mixture comprising 2,2-bis-(4-hydroxyphenyl)propane from said soaking zone.

References Cited in the file of this patent
UNITED STATES PATENTS

| | | |
|---|---|---|
| 2,374,600 | Ipatieff et al. | Apr. 24, 1945 |
| 2,388,758 | Mills, Jr. | Nov. 13, 1945 |
| 2,468,982 | Jansen | May 3, 1948 |
| 2,623,908 | Stoesser et al. | Dec. 30, 1952 |